US009403406B2

(12) United States Patent
Custodero et al.

(10) Patent No.: US 9,403,406 B2
(45) Date of Patent: Aug. 2, 2016

(54) TIRE PROVIDED WITH A TREAD INCLUDING A THERMOPLASTIC ELASTOMER AND CARBON BLACK

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Emmanuel Custodero, Clermont-Ferrand (FR); Vincent Abad, Clermont-Ferrand (FR); Vincent Lemal, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/428,888

(22) PCT Filed: Sep. 16, 2013

(86) PCT No.: PCT/EP2013/069154
§ 371 (c)(1),
(2) Date: Mar. 17, 2015

(87) PCT Pub. No.: WO2014/041167
PCT Pub. Date: Mar. 20, 2014

(65) Prior Publication Data
US 2015/0231925 A1    Aug. 20, 2015

(30) Foreign Application Priority Data

Sep. 17, 2012    (FR) .................................... 12 58694

(51) Int. Cl.
*B60C 11/00*  (2006.01)
*C08F 36/00*  (2006.01)
*C08G 73/10*  (2006.01)
*B60C 1/00*   (2006.01)
*B60C 15/00*  (2006.01)

(52) U.S. Cl.
CPC ........... *B60C 1/0016* (2013.04); *B60C 11/0008* (2013.04); *B60C 15/0009* (2013.04); *B60C 2011/0016* (2013.04)

(58) Field of Classification Search
CPC ............. B60C 1/0016; B60C 15/0009; B60C 11/0008; B60C 2011/0016
USPC ...................................................... 152/209.1
See application file for complete search history.

(56) References Cited

U.S. PATENT DOCUMENTS

| 2,766,800 | A  | 10/1956 | Rockoff ......................... 152/211 |
| 4,526,934 | A  | 7/1985  | Oshima et al. .............. 525/332.9 |
| 4,946,899 | A  | 8/1990  | Kennedy et al. ............... 525/244 |
| 5,204,407 | A  | 4/1993  | Araki et al. ...................... 525/99 |
| 5,531,469 | A  | 7/1996  | Iino et al. ..................... 280/728.3 |
| 5,591,279 | A  | 1/1997  | Midorikawa et al. ....... 152/209.4 |
| 5,726,237 | A  | 3/1998  | Satoh et al. .................... 524/495 |
| 5,756,589 | A  | 5/1998  | Sandstrom et al. ......... 525/333.1 |
| 5,876,527 | A  | 3/1999  | Tsuruta et al. ................ 152/541 |
| 5,967,211 | A  | 10/1999 | Lucas et al. ................ 152/209.4 |
| 5,977,238 | A  | 11/1999 | Labauze ...................... 524/492 |
| 6,013,718 | A  | 1/2000  | Cabioch et al. .............. 524/506 |
| 6,503,973 | B2 | 1/2003  | Robert et al. ................. 542/492 |
| 6,559,219 | B2 | 5/2003  | Tadaki et al. ................. 524/495 |
| 6,706,813 | B2 | 3/2004  | Chiba et al. ..................... 525/95 |
| 6,815,473 | B2 | 11/2004 | Robert et al. ................. 523/215 |
| 7,199,175 | B2 | 4/2007  | Vasseur ......................... 524/492 |
| 7,250,463 | B2 | 7/2007  | Durel et al. ................... 524/492 |
| 7,312,264 | B2 | 12/2007 | Gandon-Pain ............... 524/236 |
| 7,900,667 | B2 | 3/2011  | Vasseur ...................... 152/209.1 |
| 7,906,583 | B2 | 3/2011  | Lechat et al. ................... 525/89 |
| 8,563,098 | B2 | 10/2013 | Abad et al. ....................... 428/12 |
| 8,631,846 | B2 | 1/2014  | Custodero et al. ............ 152/502 |
| 8,686,086 | B2 | 4/2014  | Abad et al. .................... 524/493 |
| 8,759,438 | B2 | 6/2014  | Lopez et al. .................. 524/525 |
| 8,871,852 | B2 | 10/2014 | Lesage et al. ................. 524/474 |
| 8,999,513 | B2 | 4/2015  | Custodero et al. ....... B29C 73/20 |
| 9,132,699 | B2 | 9/2015  | Lopitaux et al. ....... B60C 1/0016 |

(Continued)

FOREIGN PATENT DOCUMENTS

EP   1 127 909 A1   8/2001
EP   2 108 527 A1   10/2009

(Continued)

OTHER PUBLICATIONS

International Search Report dated Oct. 30, 2013, issued by WIPO in connection with International Application No. PCT/EP2013/069154.
J.E. Puskas, et al., "New Transparent Flexible UV-Cured Films from Polyisobutylene-Polyisoprene Block Polymer", J. Macromol. Sci.-Chemistry, vol. A28(1), pp. 65-80 (1991).
Z. Fodor, et al., "Polyisobutylene-containing block polymers by sequential monomer addition", Polymer Bulletin, vol. 29 (6), pp. 697-704 (1992).

(Continued)

*Primary Examiner* — William Cheung
(74) *Attorney, Agent, or Firm* — Fitzpatrick, Cella, Harper & Scinto

(57) ABSTRACT

The present invention relates to a tire comprising a tread, a crown with a crown reinforcement, two sidewalls, two beads and a carcass reinforcement anchored to the two beads and extending from one sidewall to the other. The tread is based on at least one thermoplastic elastomer and on carbon black at a content by volume within a range extending from 5% to 30%, the thermoplastic elastomer being a block copolymer comprising at least one elastomer block and at least one thermoplastic block, and the total content of thermoplastic elastomer being within a range varying from 65 to 100 phr.

24 Claims, No Drawings

(56) References Cited

U.S. PATENT DOCUMENTS

| | | | |
|---|---|---|---|
| 2001/0036991 A1 | 11/2001 | Robert et al. | 524/492 |
| 2002/0014292 A1 | 2/2002 | Minagoshi | 152/209.4 |
| 2002/0019484 A1 | 2/2002 | Nahmias et al. | 535/132 |
| 2002/0183436 A1 | 12/2002 | Robert et al. | 524/492 |
| 2003/0212185 A1 | 11/2003 | Vasseur | 524/492 |
| 2004/0063854 A1 | 4/2004 | Lin et al. | 524/606 |
| 2005/0004297 A1 | 1/2005 | Durel et al. | 524/493 |
| 2005/0034797 A1* | 2/2005 | Nanni | B60C 11/00 152/209.5 |
| 2006/0089445 A1 | 4/2006 | Gandon-Pain | 524/492 |
| 2006/0089447 A1 | 4/2006 | Robertson et al. | 524/493 |
| 2006/0090830 A1* | 5/2006 | Jardine | B60C 1/00 152/510 |
| 2006/0105053 A1 | 5/2006 | Marx et al. | 424/490 |
| 2006/0148994 A1 | 7/2006 | Lesage et al. | 525/242 |
| 2006/0189755 A1 | 8/2006 | Chino et al. | 525/88 |
| 2007/0112120 A1 | 5/2007 | Vasseur | 524/492 |
| 2009/0255613 A1 | 10/2009 | Zhang et al. | 152/209.5 |
| 2010/0154945 A1 | 6/2010 | Gandon-Pain et al. | 152/151 |
| 2010/0263778 A1 | 10/2010 | Lesage et al. | 152/511 |
| 2010/0279100 A1 | 11/2010 | Heikkila et al. | 428/313.9 |
| 2011/0165408 A1 | 7/2011 | Lesage et al. | 428/320.2 |
| 2011/0180193 A1 | 7/2011 | Custodero et al. | 152/503 |
| 2011/0308687 A1* | 12/2011 | Pagano | B60C 1/0016 152/548 |
| 2012/0065292 A1 | 3/2012 | Lopitaux et al. | 523/150 |
| 2012/0149822 A1 | 6/2012 | Abad et al. | 524/449 |
| 2012/0156400 A1 | 6/2012 | Abad et al. | 428/12 |
| 2012/0180923 A1 | 7/2012 | Custodero et al. | 152/502 |
| 2012/0214933 A1 | 8/2012 | Lopez et al. | 524/502 |
| 2012/0273109 A1 | 11/2012 | Merino Lopez et al. | 152/502 |
| 2012/0285597 A1 | 11/2012 | Abad et al. | 152/450 |
| 2012/0315408 A1 | 12/2012 | Chouvel et al. | 428/12 |
| 2013/0072621 A1 | 3/2013 | Abad et al. | 524/505 |
| 2013/0096230 A1 | 4/2013 | Abad et al. | C08J 3/22 |
| 2013/0116526 A1 | 5/2013 | Custodero et al. | 524/526 |
| 2013/0168001 A1 | 7/2013 | Abad et al. | 152/511 |
| 2013/0174952 A1 | 7/2013 | Abad et al. | 152/209.1 |
| 2013/0196086 A1 | 8/2013 | Abad et al. | 428/12 |
| 2013/0209716 A1 | 8/2013 | Custodero et al. | 428/36.8 |
| 2014/0044964 A1 | 2/2014 | Abad et al. | 428/378 |
| 2014/0045983 A1 | 2/2014 | Abad et al. | 524/440 |
| 2014/0051312 A1 | 2/2014 | Abad et al. | 442/149 |
| 2014/0076473 A1 | 3/2014 | Abad et al. | B60C 1/00016 |
| 2014/0083589 A1 | 3/2014 | Abad et al. | B60C 1/00 |
| 2014/0190604 A1 | 7/2014 | Custodero et al. | B60C 11/0008 |
| 2014/0290204 A1 | 10/2014 | Custodero et al. | 57/7 |
| 2014/0299249 A1 | 10/2014 | Custodero et al. | 152/525 |
| 2014/0305558 A1 | 10/2014 | Abad et al. | 152/209.1 |
| 2014/0343190 A1 | 11/2014 | Custodero et al. | 523/156 |
| 2014/0343216 A1 | 11/2014 | Custodero et al. | 524/505 |
| 2015/0004413 A1 | 1/2015 | Abad et al. | 428/378 |
| 2015/0030851 A1 | 1/2015 | Abad et al. | 428/378 |
| 2015/0034226 A1 | 2/2015 | Abad et al. | 152/450 |
| 2015/0034230 A1 | 2/2015 | Abad et al. | 156/96 |
| 2015/0079323 A1 | 3/2015 | Abad et al. | 428/36.4 |

FOREIGN PATENT DOCUMENTS

| | | |
|---|---|---|
| FR | 2 740 778 | 5/1997 |
| FR | 2 765 882 | 1/1999 |
| FR | 2 918 669 | 1/2009 |
| FR | 2 947 275 A1 | 12/2010 |
| FR | 2 948 320 | 1/2011 |
| JP | 4-55443 A | 2/1992 |
| JP | 6-328906 | 11/1994 |
| JP | 7-1675 A | 1/1995 |
| JP | 10-298352 | 11/1998 |
| JP | 2000-256509 A | 9/2000 |
| JP | 2003-012861 A | 1/2003 |
| JP | 2006-232965 | 9/2006 |
| JP | 2007-223480 A | 9/2007 |
| JP | 2007-277485 | 10/2007 |
| JP | 2007-326909 A | 12/2007 |
| JP | 2007-332246 A | 12/2007 |
| JP | 2010-185025 A | 8/2010 |
| JP | 2011-46775 | 3/2011 |
| JP | 2012-102269 A | 5/2012 |
| WO | 01/92402 A1 | 12/2001 |
| WO | 02/10269 A2 | 2/2002 |
| WO | 03/016387 A1 | 2/2003 |
| WO | 2004/096865 A2 | 11/2004 |
| WO | 2006/055612 A1 | 5/2006 |
| WO | 2009/156049 A1 | 12/2009 |
| WO | 2009/156050 A1 | 12/2009 |
| WO | 2010/105984 A1 | 9/2010 |
| WO | 2011/073186 A1 | 6/2011 |
| WO | 2011/161222 A1 | 12/2011 |

OTHER PUBLICATIONS

J.P. Kennedy, et al., "Polyisobutylene-Containing Block Copolymers by Sequential Monomer Addition. 5. Synthesis, Characterization, and Select Properties of Poly(p-tert-butylstyrene-b-isobutylene-b-p-tert-butylstyrene)", Macromolecules, 24, pp. 6572-6577 (1991).

G. Kaszas, et al., "New Thermoplastic Elastomers of Rubbery Polyisobutylene and Glassy Cyclopolyisoprene Segments", J. Appl. Polymer Sci., vol. 39, pp. 119-144 (1990).

J.E. Puskas, et al., "Polyisobutylene-Containing Block Polymers by Sequential Monomer Addition. IV. New Triblock Thermoplastic Elastomers Comprising High Tg Styrenic Glassy Segments: Synthesis, Characterization and Physical Properties", J. Polymer Sci.: Part A: Polymer Chemistry, vol. 30, pp. 41-48 (1992).

* cited by examiner

TIRE PROVIDED WITH A TREAD INCLUDING A THERMOPLASTIC ELASTOMER AND CARBON BLACK

This application is the international stage of a 371 to PCT/EP2013/069154, filed Sep. 16, 2013, which claims priority to French Application 1258694 filed in France on Sep. 17, 2012. The entire contents of these applications are hereby incorporated by reference in their entireties.

FIELD OF THE INVENTION

The present invention relates to tyres provided with a tread.

RELATED ART

In a conventional tyre, the tread comprises predominantly diene elastomers.

A continual objective of tyre manufacturers is to improve the wet grip of the tyres. At the same time, another objective is to reduce the rolling resistance of the tyres. However, these two objectives are difficult to reconcile since the improvement in the grip supposes an increase in the hysteresis losses whereas the improvement in the rolling resistance supposes a lowering in the hysteresis losses. There thus exists a compromise in performance to be optimized. In addition to this compromise between the grip and the rolling resistance, it is important for the composition of the treads to make possible a good wear resistance.

With this aim, the Applicant Company has found, surprisingly, that a tyre provided with a specific tread makes it possible to obtain a very good compromise in the grip and rolling resistance performances, while having a good wear resistance.

BRIEF DESCRIPTION OF EMBODIMENTS OF THE INVENTION

A subject-matter of the invention is a tyre comprising a tread, a crown with a crown reinforcement, two sidewalls, two beads and a carcass reinforcement anchored to the two beads and extending from one sidewall to the other, in which the tread is based on at least one thermoplastic elastomer and on carbon black at a content by volume within a range extending from 5% to 30%, the said thermoplastic elastomer being a block copolymer comprising at least one elastomer block and at least one thermoplastic block, and the total content of thermoplastic elastomer being within a range varying from 65 to 100 phr (parts by weight per hundred parts of elastomer).

Preferably, the invention relates to a tyre as defined above, in which the number-average molecular weight of the thermoplastic elastomer is between 30 000 and 500 000 g/mol.

Preferably, the invention relates to a tyre as defined above, in which the elastomer block or blocks of the block copolymer are chosen from elastomers having a glass transition temperature of less than 25° C., preferably selected from the group consisting of ethylene elastomers, diene elastomers and their mixtures, more preferably from ethylene elastomers, alternatively from diene elastomers and more particularly from diene elastomers resulting from isoprene, butadiene or a mixture of the latter.

Preferably again, the invention relates to a tyre as defined above, in which the thermoplastic block or blocks of the block copolymer are chosen from polymers having a glass transition temperature of greater than 80° C. and, in the case of a semicrystalline thermoplastic block, a melting point of greater than 80° C., and, in particular, selected from the group consisting of polyolefins, polyurethanes, polyamides, polyesters, polyacetals, polyethers, polyphenylene sulphides, polyfluorinated compounds, polystyrenes, polycarbonates, polysulphones, polymethyl methacrylate, polyetherimide, thermoplastic copolymers and their mixtures, more preferably chosen from polystyrenes.

Very preferably, the invention relates to a tyre as defined above, in which the thermoplastic elastomer or elastomers are selected from the group consisting of styrene/butadiene (SB), styrene/isoprene (SI), styrene/butadiene/isoprene (SBI), styrene/butadiene/styrene (SBS), styrene/isoprene/styrene (SIS) and styrene/butadiene/isoprene/styrene (SBIS) thermoplastic elastomers and the mixtures of these copolymers.

According to one embodiment, the invention relates to a tyre as defined above, in which the thermoplastic elastomer is the only elastomer of the tread.

According to another embodiment, the invention relates to a tyre as defined above, in which the tread additionally comprises a non-thermoplastic elastomer at a content of at most 35 phr.

Preferably, the invention relates to a tyre as defined above, in which the carbon black is present at a content by volume within a range extending from 7% to 30%, preferably from 10% to 25%.

According to a preferred embodiment, the invention relates to a tyre as defined above, in which the carbon black is chosen from carbon blacks with a BET specific surface of greater than 80 $m^2/g$, preferably of greater than 90 $m^2/g$. More preferably, the carbon black is a carbon black with a BET specific surface of greater than 120 $m^2/g$.

Preferably, the invention relates to a tyre as defined above, in which the composition of the tread additionally comprises a plasticizer, preferably at a content of between 5 and 85 phr. Preferably, the plasticizer is a plasticizing resin and/or a plasticizing oil. More preferably, the oil is a paraffinic oil. Preferably again, the plasticizer is present at a content within a range extending from 10 to 60 phr.

The invention relates more particularly to the tyres intended to equip motorless vehicles, such as bicycles, or motor vehicles of the following types: passenger vehicles, SUVs (Sport Utility Vehicles), two-wheel vehicles (in particular motorcycles), aircraft, as for industrial vehicles chosen from vans, heavy-duty vehicles—that is to say, underground trains, buses, heavy road transport vehicles (lorries, tractors, trailers) or off-road vehicles, such as agricultural vehicles or earthmoving equipment—, or other transportation or handling vehicles.

DETAILED DESCRIPTION OF THE INVENTION

In the present description, unless expressly indicated otherwise, all the percentages (%) shown are percentages by weight.

Furthermore, the term "phr" means, within the meaning of the present patent application, parts by weight per hundred parts of elastomer, thermoplastic and non-thermoplastic mixed together. Within the meaning of the present invention, thermoplastic elastomers (TPEs) are included among the elastomers.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

1. Composition of the Tread

The tyre according to the invention has the essential characteristic of comprising a tread, a crown with a crown reinforcement, two sidewalls, two beads and a carcass reinforcement anchored to the two beads and extending from one sidewall to the other, in which the tread is based on at least one thermoplastic elastomer and on carbon black at a content by volume within a range extending from 5% to 30%, the said thermoplastic elastomer being a block copolymer comprising at least one elastomer block and at least one thermoplastic block, and the total content of thermoplastic elastomer being within a range varying from 65 to 100 phr (parts by weight per hundred parts of elastomer).

1.1. Thermoplastic Elastomer (TPE)

Thermoplastic elastomers (abbreviated to "TPEs") have a structure intermediate between thermoplastic polymers and elastomers. These are block copolymers composed of rigid thermoplastic blocks connected via flexible elastomer blocks.

The thermoplastic elastomer used for the implementation of the invention is a block copolymer, the chemical nature of the thermoplastic blocks and elastomer blocks of which can vary.

1.1.1. Structure of the TPE

The number-average molecular weight (denoted Mn) of the TPE is preferably between 30 000 and 500 000 g/mol, more preferably between 40 000 and 400 000 g/mol. Below the minima indicated, there is a risk of the cohesion between the elastomer chains of the TPE being affected, in particular due to its possible dilution (in the presence of an extending oil); furthermore, there is a risk of an increase in the working temperature affecting the mechanical properties, in particular the properties at break, with the consequence of a reduced "hot" performance. Furthermore, an excessively high weight Mn can be damaging to the use. Thus, it has been found that a value within a range from 50 000 to 300 000 g/mol was particularly well suited, in particular to use of the TPE in a tyre tread composition.

The number-average molecular weight (Mn) of the TPE elastomer is determined, in a known manner, by steric exclusion chromatography (SEC). For example, in the case of styrene thermoplastic elastomers, the sample is dissolved beforehand in tetrahydrofuran at a concentration of approximately 1 g/l and then the solution is filtered through a filter with a porosity of 0.45 μm before injection. The apparatus used is a Waters Alliance chromatographic line. The elution solvent is tetrahydrofuran, the flow rate is 0.7 ml/min, the temperature of the system is 35° C. and the analytical time is 90 min. A set of four Waters columns in series, with the Styragel tradenames (HMW7, HMW6E and two HT6E), is used. The injected volume of the solution of the polymer sample is 100 μl. The detector is a Waters 2410 differential refractometer and its associated software, for making use of the chromatographic data, is the Waters Millennium system. The calculated average molar masses are relative to a calibration curve produced with polystyrene standards. The conditions can be adjusted by a person skilled in the art.

The value of the polydispersity index PI (reminder: PI=Mw/Mn, with Mw the weight-average molecular weight and Mn the number-average molecular weight) of the TPE is preferably less than 3, more preferably less than 2 and more preferably still less than 1.5.

In the present patent application, when reference is made to the glass transition temperature of the TPE, it concerns the Tg relative to the elastomer block. The TPE preferably exhibits a glass transition temperature ("Tg") which is preferably less than or equal to 25° C., more preferably less than or equal to 10° C. A Tg value greater than these minima can reduce the performance of the tread when used at very low temperature; for such a use, the Tg of the TPE is more preferably still less than or equal to −10° C. Preferably again, the Tg of the TPE is greater than −100° C.

In a known way, TPEs exhibit two glass transition temperature peaks (Tg, measured according to ASTM D3418), the lowest temperature being relative to the elastomer part of the TPE and the highest temperature being relative to the thermoplastic part of the TPE. Thus, the flexible blocks of the TPEs are defined by a Tg which is less than ambient temperature (25° C.), while the rigid blocks have a Tg which is greater than 80° C.

In order to be both elastomeric and thermoplastic in nature, the TPE has to be provided with blocks which are sufficiently incompatible (that is to say, different as a result of their respective weights, their respective polarities or their respective Tg values) to retain their own properties of elastomer block or thermoplastic block.

The TPEs can be copolymers with a small number of blocks (less than 5, typically 2 or 3), in which case these blocks preferably have high weights of greater than 15 000 g/mol. These TPEs can, for example, be diblock copolymers, comprising a thermoplastic block and an elastomer block. They are often also triblock elastomers with two rigid segments connected by a flexible segment. The rigid and flexible segments can be positioned linearly, or in a star or branched configuration. Typically, each of these segments or blocks often comprises a minimum of more than 5, generally of more than 10, base units (for example, styrene units and butadiene units for a styrene/butadiene/styrene block copolymer).

The TPEs can also comprise a large number of smaller blocks (more than 30, typically from 50 to 500), in which case these blocks preferably have relatively low weights, for example from 500 to 5000 g/mol; these TPEs will subsequently be referred to as multiblock TPEs and are an elastomer block/thermoplastic block series.

According to a first alternative form, the TPE is provided in a linear form. For example, the TPE is a diblock copolymer: thermoplastic block/elastomer block. The TPE can also be a triblock copolymer: thermoplastic block/elastomer block/thermoplastic block, that is to say a central elastomer block and two terminal thermoplastic blocks, at each of the two ends of the elastomer block. Equally, the multiblock TPE can be a linear series of elastomer blocks/thermoplastic blocks.

According to another alternative form of the invention, the TPE of use for the requirements of the invention is provided in a star-branched form comprising at least three branches. For example, the TPE can then be composed of a star-branched elastomer block comprising at least three branches and of a thermoplastic block located at the end of each of the branches of the elastomer block. The number of branches of the central elastomer can vary, for example, from 3 to 12 and preferably from 3 to 6.

According to another alternative form of the invention, the TPE is provided in a branched or dendrimer form. The TPE can then be composed of a branched or dendrimer elastomer block and of a thermoplastic block located at the end of the branches of the dendrimer elastomer block.

1.1.2. Nature of the Elastomer Blocks

The elastomer blocks of the TPE for the requirements of the invention can be any elastomer known to a person skilled in the art. They preferably have a Tg of less than 25° C., preferably of less than 10° C., more preferably of less than 0° C. and very preferably of less than −10° C. Preferably again, the Tg of the elastomer block of the TPE is greater than −100° C.

For the elastomer blocks comprising a carbon-based chain, if the elastomer part of the TPE does not comprise an ethylenic unsaturation, it will be referred to as a saturated elastomer block. If the elastomer block of the TPE comprises ethylenic unsaturations (that is to say, carbon-carbon double bonds), it will then be referred to as an unsaturated or diene elastomer block.

A saturated elastomer block is composed of a polymer sequence obtained by the polymerization of at least one (that is to say, one or more) ethylenic monomer, that is to say, a monomer comprising a carbon-carbon double bond. Mention may be made, among the blocks resulting from these ethylenic monomers, of polyalkylene blocks, such as ethylene/propylene or ethylene/butylene random copolymers. These saturated elastomer blocks can also be obtained by hydrogenation of unsaturated elastomer blocks. They can also be aliphatic blocks resulting from the families of the polyethers, polyesters or polycarbonates.

In the case of saturated elastomer blocks, this elastomer block of the TPE is preferably predominantly composed of ethylenic units. Predominantly is understood to mean the highest content by weight of ethylenic monomer, with respect to the total weight of the elastomer block, and preferably a content by weight of more than 50%, more preferably of more than 75% and more preferably still of more than 85%.

Conjugated $C_4$-$C_{14}$ dienes can be copolymerized with the ethylenic monomers. They are, in this case, random copolymers. Preferably, these conjugated dienes are chosen from isoprene, butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,3-dimethyl-1,3-hexadiene, 2,4-dimethyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene or their mixture. More preferably, the conjugated diene is isoprene or a mixture comprising isoprene.

In the case of unsaturated elastomer blocks, this elastomer block of the TPE is preferably predominantly composed of a diene elastomer part. Predominantly is understood to mean the highest content by weight of diene monomer, with respect to the total weight of the elastomer block, and preferably a content by weight of more than 50%, more preferably of more than 75% and more preferably still of more than 85%. Alternatively, the unsaturation of the unsaturated elastomer block can originate from a monomer comprising a double bond and an unsaturation of cyclic type, which is the case, for example, in polynorbornene.

Preferably, conjugated $C_4$-$C_{14}$ dienes can be polymerized or copolymerized in order to form a diene elastomer block. Preferably, these conjugated dienes are chosen from isoprene, butadiene, piperylene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,5-dimethyl-1,3-pentadiene, 2-methyl-1,4-pentadiene, 1,3-hexadiene, 2-methyl-1,3-hexadiene, 2-methyl-1,5-hexadiene, 3-methyl-1,3-hexadiene, 4-methyl-1,3-hexadiene, 5-methyl-1,3-hexadiene, 2,5-dimethyl-1,3-hexadiene, 2,5-dimethyl-2,4-hexadiene, 2-neopentyl-1,3-butadiene, 1,3-cyclopentadiene, methylcyclopentadiene, 2-methyl-1,6-heptadiene, 1,3-cyclohexadiene, 1-vinyl-1,3-cyclohexadiene or their mixture. More preferably, the conjugated diene is isoprene or butadiene or a mixture comprising isoprene and/or butadiene.

According to an alternative form, the monomers polymerized in order to form the elastomer part of the TPE can be randomly copolymerized with at least one other monomer, so as to form an elastomer block. According to this alternative form, the molar fraction of polymerized monomer, other than an ethylenic monomer, with respect to the total number of units of the elastomer block, has to be such that this block retains its elastomer properties. Advantageously, the molar fraction of this other comonomer can range from 0% to 50%, more preferably from 0% to 45% and more preferably still from 0% to 40%.

By way of illustration, this other monomer capable of copolymerizing with the first monomer can be chosen from ethylenic monomers as defined above (for example ethylene), diene monomers, more particularly the conjugated diene monomers having from 4 to 14 carbon atoms as defined above (for example butadiene), monomers of vinylaromatic type having from 8 to 20 carbon atoms as defined above, or also a monomer such as vinyl acetate may be involved.

When the comonomer is of vinylaromatic type, it advantageously represents a fraction of units, with regard to the total number of units of the thermoplastic block, from 0% to 50%, preferably ranging from 0% to 45% and more preferably still ranging from 0% to 40%. The styrene monomers mentioned above, namely methylstyrenes, para(tert-butyl)styrene, chlorostyrenes, bromostyrenes, fluorostyrenes or also para-hydroxystyrene, are suitable in particular as vinylaromatic compounds. Preferably, the comonomer of vinylaromatic type is styrene.

According to a preferred embodiment of the invention, the elastomer blocks of the TPE exhibit, in total, a number-average molecular weight (Mn) ranging from 25 000 g/mol to 350 000 g/mol, preferably from 35 000 g/mol to 250 000 g/mol, so as to confer, on the TPE, good elastomeric properties and a mechanical strength which is sufficient and compatible with the use as tyre tread.

The elastomer block can also be a block comprising several types of ethylenic, diene or styrene monomers as defined above.

The elastomer block can also be composed of several elastomer blocks as defined above.

1.1.3. Nature of the Thermoplastic Blocks

Use will be made, for the definition of the thermoplastic blocks, of the characteristic of glass transition temperature (Tg) of the rigid thermoplastic block. This characteristic is well known to a person skilled in the art. It makes it possible in particular to choose the industrial processing (transformation) temperature. In the case of an amorphous polymer (or polymer block), the processing temperature is chosen to be substantially greater than the Tg. In the specific case of a semicrystalline polymer (or polymer block), a melting point may be observed which is then greater than the glass transition temperature. In this case, it is instead the melting point (M.p.) which makes it possible to choose the processing temperature for the polymer (or polymer block) under consideration. Thus, subsequently, when reference will be made to "Tg (or M.p., if appropriate)", it will be necessary to consider that this is the temperature used to choose the processing temperature.

For the requirements of the invention, the TPE elastomers comprise one or more thermoplastic block(s) preferably having a Tg (or M.p., if appropriate) of greater than or equal to 80° C. and formed from polymerized monomers. Preferably, this thermoplastic block has a Tg (or M.p., if appropriate)

within a range varying from 80° C. to 250° C. Preferably, the Tg (or M.p., if appropriate) of this thermoplastic block is preferably from 80° C. to 200° C., more preferably from 80° C. to 180° C.

The proportion of the thermoplastic blocks, with respect to the TPE as defined for the implementation of the invention, is determined, on the one hand, by the thermoplasticity properties which the said copolymer has to exhibit. The thermoplastic blocks having a Tg (or M.p., if appropriate) of greater than or equal to 80° C. are preferably present in proportions sufficient to retain the thermoplastic nature of the elastomer according to the invention. The minimum content of thermoplastic blocks having a Tg (or M.p., if appropriate) of greater than or equal to 80° C. in the TPE can vary as a function of the conditions of use of the copolymer. On the other hand, the ability of the TPE to deform during the preparation of the tyre can also contribute to determining the proportion of the thermoplastic blocks having a Tg (or M.p., if appropriate) of greater than or equal to 80° C.

The thermoplastic blocks having a Tg (or M.p., if appropriate) of greater than or equal to 80° C. can be formed from polymerized monomers of various natures; in particular, they can constitute the following blocks or their mixtures:

polyolefins (polyethylene, polypropylene);
polyurethanes;
polyamides;
polyesters;
polyacetals;
polyethers (polyethylene oxide, polyphenylene ether);
polyphenylene sulphides;
polyfluorinated compounds (FEP, PFA, ETFE);
polystyrenes (described in detail below);
polycarbonates;
polysulphones;
polymethyl methacrylate;
polyetherimide;
thermoplastic copolymers, such as the acrylonitrile/butadiene/styrene (ABS) copolymer.

The thermoplastic blocks having a Tg (or M.p., if appropriate) of greater than or equal to 80° C. can also be obtained from monomers chosen from the following compounds and their mixtures:

acenaphthylene: a person skilled in the art may refer, for example, to the paper by Z. Fodor and J. P. Kennedy, Polymer Bulletin, 1992, 29(6), 697-705;
indene and its derivatives, such as, for example, 2-methylindene, 3-methylindene, 4-methylindene, dimethylindene, 2-phenylindene, 3-phenylindene and 4-phenylindene; a person skilled in the art may, for example, refer to the patent document U.S. Pat. No. 4,946,899, by the inventors Kennedy, Puskas, Kaszas and Hager, and to the documents by J. E. Puskas, G. Kaszas, J. P. Kennedy and W. G Hager, Journal of Polymer Science, Part A, Polymer Chemistry (1992), 30, 41, and J. P. Kennedy, N. Meguriya and B. Keszler, Macromolecules (1991), 24(25), 6572-6577;
isoprene, then resulting in the formation of a certain number of trans-1,4-polyisoprene units and of units cyclized according to an intramolecular process; a person skilled in the art may, for example, refer to the documents by G. Kaszas, J. E. Puskas and P. Kennedy, Applied Polymer Science (1990), 39(1), 119-144, and J. E. Puskas, G. Kaszas and J. P. Kennedy, Macromolecular Science, Chemistry A28 (1991), 65-80.

The polystyrenes are obtained from styrene monomers. Styrene monomer should be understood as meaning, in the present description, any monomer comprising styrene, unsubstituted and substituted; mention may be made, among substituted styrenes, for example, of methylstyrenes (for example, o-methylstyrene, m-methylstyrene or p-methylstyrene, α-methylstyrene, α,2-dimethylstyrene, α,4-dimethylstyrene or diphenylethylene), para-(tert-butyl)styrene, chlorostyrenes (for example, o-chlorostyrene, m-chlorostyrene, p-chlorostyrene, 2,4-dichlorostyrene, 2,6-dichlorostyrene or 2,4,6-trichlorostyrene), bromostyrenes (for example, o-bromostyrene, m-bromostyrene, p-bromostyrene, 2,4-dibromostyrene, 2,6-dibromostyrene or 2,4,6-tribromostyrene), fluorostyrenes (for example, o-fluorostyrene, m-fluorostyrene, p-fluorostyrene, 2,4-difluorostyrene, 2,6-difluorostyrene or 2,4,6-trifluorostyrene) or also para-hydroxystyrene.

According to a preferred embodiment of the invention, the content by weight of styrene in the TPE elastomer is between 5% and 50%. Below the minimum indicated, there is a risk of the thermoplastic nature of the elastomer being substantially reduced while, above the recommended maximum, the elasticity of the tread can be affected. For these reasons, the styrene content is more preferably between 10% and 40%.

According to an alternative form of the invention, the polymerized monomer as defined above can be copolymerized with at least one other monomer, so as to form a thermoplastic block having a Tg (or M.p., if appropriate) as defined above.

By way of illustration, this other monomer capable of copolymerizing with the polymerized monomer can be chosen from diene monomers, more particularly conjugated diene monomers having from 4 to 14 carbon atoms, and monomers of vinylaromatic type having from 8 to 20 carbon atoms, such as defined in the part relating to the elastomer block.

According to the invention, the thermoplastic blocks of the TPE exhibit, in total, a number-average molecular weight (Mn) ranging from 5 000 g/mol to 150 000 g/mol, so as to confer, on the TPE, good elastomeric properties and a mechanical strength which is sufficient and compatible with the use as tyre tread.

The thermoplastic block can also be composed of several thermoplastic blocks as defined above.

1.1.4. TPE Examples

For example, the TPE is a copolymer, the elastomer part of which is saturated and which comprises styrene blocks and alkylene blocks. The alkylene blocks are preferably ethylene, propylene or butylene. More preferably, this TPE elastomer is selected from the following group consisting of diblock or triblock copolymers which are linear or star-branched: styrene/ethylene/butylene (SEB), styrene/ethylene/propylene (SEP), styrene/ethylene/ethylene/propylene (SEEP), styrene/ethylene/butylene/styrene (SEBS), styrene/ethylene/propylene/styrene (SEPS), styrene/ethylene/ethylene/propylene/styrene (SEEPS), styrene/isobutylene (SIB), styrene/isobutylene/styrene (SIBS) and the mixtures of these copolymers.

According to another example, the TPE is a copolymer, the elastomer part of which is unsaturated and which comprises styrene blocks and diene blocks, these diene blocks being in particular isoprene or butadiene blocks. More preferably, this TPE elastomer is selected from the following group consisting of diblock or triblock copolymers which are linear or star-branched: styrene/butadiene (SB), styrene/isoprene (SI), styrene/butadiene/isoprene (SBI), styrene/butadiene/styrene (SBS), styrene/isoprene/styrene (SIS), styrene/butadiene/isoprene/styrene (SBIS) and the mixtures of these copolymers.

For example again, the TPE is a linear or star-branched copolymer, the elastomer part of which comprises a saturated part and an unsaturated part, such as, for example, styrene/ butadiene/butylene (SBB), styrene/butadiene/butylene/styrene (SBBS) or a mixture of these copolymers.

Mention may be made, among multiblock TPEs, of the copolymers comprising random copolymer blocks of ethylene and propylene/polypropylene, polybutadiene/polyurethane (TPU), polyether/polyester (COPE) or polyether/polyamide (PEBA).

It is also possible for the TPEs given as example above to be mixed with one another within the tread according to the invention.

Mention may be made, as examples of commercially available TPE elastomers, of the elastomers of SEPS, SEEPS or SEBS type sold by Kraton under the Kraton G name (e.g., G1650, G1651, G1654 and G1730 products) or Kuraray under the Septon name (e.g., Septon 2007, Septon 4033 or Septon 8004), or the elastomers of SIS type sold by Kuraray under the name Hybrar 5125 or sold by Kraton under the name D1161, or also the elastomers of linear SBS type sold by Polimeri Europa under the name Europrene SOLT 166 or of star-branched SBS type sold by Kraton under the name D1184. Mention may also be made of the elastomers sold by Dexco Polymers under the Vector name (e.g., Vector 4114 or Vector 8508). Mention may be made, among multiblock TPEs, of the Vistamaxx TPE sold by Exxon; the COPE TPE sold by DSM under the Arnitel name or by DuPont under the Hytrel name or by Ticona under the Riteflex name; the PEBA TPE sold by Arkema under the PEBAX name; or the TPU TPE sold by Sartomer under the name TPU 7840 or by BASF under the Elastogran name.

1.1.5. TPE Amount

If optional other (non-thermoplastic) elastomers are used in the composition, the TPE elastomer or elastomers constitute the predominant fraction by weight; they then represent at least 65% by weight, preferably at least 70% by weight and more preferably at least 75% by weight of the combined elastomers present in the elastomer composition. Preferably again, the TPE elastomer or elastomers represent at least 95% (in particular 100%) by weight of the combined elastomers present in the elastomer composition.

Thus, the amount of TPE elastomer is within a range which varies from 65 to 100 phr, preferably from 70 to 100 phr and in particular from 75 to 100 phr. Preferably again, the composition comprises from 95 to 100 phr of TPE elastomer. The TPE elastomer or elastomers are preferably the only elastomer or elastomers of the tread.

1.2 Non-Thermoplastic Elastomer

The thermoplastic elastomer or elastomers described above are sufficient by themselves alone for the tread according to the invention to be usable.

The composition of the tread according to the invention can comprise at least one (that is to say, one or more) diene rubber as non-thermoplastic elastomer, it being possible for this diene rubber to be used alone or as a blend with at least one (that is to say, one or more) other non-thermoplastic rubber or elastomer.

The total content of optional non-thermoplastic elastomer is within a range varying from 0 to 35 phr, preferably from 0 to 30 phr, more preferably from 0 to 25 phr and more preferably still from 0 to 5 phr. Thus, when the tread comprises them, the non-thermoplastic elastomers represent at most 35 phr, preferably at most 30 phr, more preferably at most 25 phr and very preferably at most 5 phr. Very preferably again, the tread of the tyre according to the invention does not comprise a non-thermoplastic elastomer.

"Diene" elastomer or rubber should be understood as meaning, in a known way, an (one or more is understood) elastomer resulting at least in part (i.e., a homopolymer or a copolymer) from diene monomers (monomers carrying two carbon-carbon double bonds which may or may not be conjugated).

These diene elastomers can be classified into two categories: "essentially unsaturated" or "essentially saturated".

"Essentially unsaturated" is understood to mean generally a diene elastomer resulting at least in part from conjugated diene monomers having a content of units of diene origin (conjugated dienes) which is greater than 15% (mol %). In the category of "essentially unsaturated" diene elastomers, "highly unsaturated" diene elastomer is understood to mean in particular a diene elastomer having a content of units of diene origin (conjugated dienes) which is greater than 50%.

Thus it is that diene elastomers such as some butyl rubbers or copolymers of dienes and of α-olefins of EPDM type can be described as "essentially saturated" diene elastomers (low or very low content of units of diene origin, always less than 15%).

Given these definitions, diene elastomer, whatever the above category, capable of being used in the compositions in accordance with the invention is understood more particularly to mean:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d)—a copolymer of isobutene and of isoprene (diene butyl rubber) and also the halogenated versions, in particular chlorinated or brominated versions, of this type of copolymer.

Any type of diene elastomer can be used in the invention. When the composition comprises a vulcanization system, use is preferably made of essentially unsaturated elastomers, in particular of the (a) and (b) types above, in the manufacture of the tread of the tyre according to the present invention.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be prepared in dispersion or in solution; they can be coupled and/or star-branched or else functionalized with a coupling and/or star-branching or functionalization agent. Mention may be made, for example, for coupling to carbon black, of functional groups comprising a C—Sn bond or aminated functional groups, such as benzophenone, for example; mention may be made, for example, for coupling to a reinforcing inorganic filler, such as silica, of silanol functional groups or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973). Mention may also be made, as other examples of functionalized elastomers, of elastomers (such as SBR, BR, NR or IR) of the epoxidized type.

1.3. Carbon Black

The tread according to the invention also comprises carbon black.

The content by volume of carbon black in the composition is within a range from 5% to 30%, preferably from 7% to 30% and more preferably still from 10% to 25%. These contents by volume correspond to the volume of filler with respect to the total volume of the composition. For example, they correspond to a content of 10 to 85 phr for a plasticizer-free composition, preferably from 15 phr to 85 phr and more preferably still from 20 phr to 65 phr. For a composition with 20 phr of plasticizer, they correspond to a content of 12 to 100 phr, preferably of 18 phr to 100 phr and more preferably still of 25 phr to 80 phr. Above 30% of carbon black, the hysteresis (and the rolling resistance) of the tyre composition is too high and, below 5% of carbon black, the amount of carbon black is too low to make possible a good wear resistance of the tread.

According to a preferred embodiment, the composition comprises from 30 to 120 phr of carbon black, more preferably from 40 to 95 phr and more preferably still from 50 to 70 phr.

All the carbon blacks conventionally used in tyres ("tyre-grade" blacks) are suitable as carbon blacks. Mention will more particularly be made, for example, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772), indeed even N990.

According to a preferred embodiment, use will be made of a carbon black with a BET specific surface of greater than 80 $m^2/g$, more preferably of greater than 90 $m^2/g$ and more preferably still of greater than 120 $m^2/g$. It should be specified that the BET specific surface was measured according to Standard ASTM D6556-09 [multipoint (5 point) method—gas: nitrogen—relative pressure range P/Po: 0.05 to 0.30]. Also suitable as carbon black is a mixture of carbon blacks which is characterized in that the mixture of carbon blacks has a BET specific surface of greater than 80 $m^2/g$, more preferably of greater than 90 $m^2/g$ and more preferably still of greater than 120 $m^2/g$. Mention may be made, as carbon blacks suitable for this preferred embodiment, of the blacks of a series less than or equal to 300 (ASTM grade), such as the blacks of the 300, 200 or 100 series, such as, for example, the N115, N134, N234, N326, N330, N339, N347 or N375 blacks and more preferably the blacks of the 100 and 200 series, such as the N115, N134 or N234 blacks.

1.4. Plasticizers

The thermoplastic elastomer described above is sufficient by itself alone for the tread according to to be usable.

However, according to a preferred embodiment of the invention, the elastomer composition described above can also comprise a plasticizing agent, such as an oil (or plasticizing oil or extending oil) or a plasticizing resin, the role of which is to facilitate the processing of the tread, in particular its incorporation in the tyre, by a lowering of the modulus, an adjustment of the glass transition temperature (Tg) and an increase in the tackifying power.

Use may be made of any oil capable of extending or plasticizing elastomers, in particular thermoplastic elastomers. At ambient temperature (23° C.), these oils, which are more or less viscous, are liquids (that is to say, as a reminder, substances which have the ability to eventually assume the shape of their container), in contrast in particular to resins or rubbers, which are by nature solids. Use may also be made of any type of plasticizing resin known to a person skilled in the art.

For example, the extending oil is selected from the group consisting of paraffinic oils, such as a low viscosity paraffinic oil (LVPO).

When it is used, it is preferable for the content of extending oil to be within a range varying from more than 0 to 100 phr, preferably from 5 to 85 phr, more preferably from 10 to 60 phr, according to the Tg and the modulus which are targeted for the tread.

A person skilled in the art will know, in the light of the description and implementational examples which follow, how to adjust the amount of plasticizer as a function of the TPE elastomer used (as indicated above) and of the content of carbon black, and of the specific conditions of use of the tyre provided with the tread, and in particular as a function of the tyre in which it is intended to be used.

1.5. Various Additives

The tread described above can furthermore comprise the various additives normally present in the treads known to a person skilled in the art. The choice will be made, for example, of one or more additives chosen from protection agents, such as antioxidants or antiozonants, UV stabilizers, the various processing aids or other stabilizers, or also promoters capable of promoting the adhesion to the remainder of the structure of the tyre. Preferably, the tread does not comprise all these additives at the same time and, more preferably still, the underlayer does not comprise any of these agents.

Equally and optionally, the composition of the tread of the invention can comprise a crosslinking system known to a person skilled in the art. Preferably, the composition does not comprise a crosslinking system. In the same way, the composition of the tread of the invention can comprise one or more inert micrometric fillers, such as lamellar fillers, known to a person skilled in the art. Preferably, the composition does not comprise a micrometric filler.

In addition to the elastomers described above, the composition of the tread might also comprise, always according to a minor fraction by weight with respect to the block elastomer, of polymers other than elastomers, such as, for example, thermoplastic polymers. When they are present in the composition, it is preferable for the total content of non-elastomeric thermoplastic polymers to be less than 40 phr, preferably between 5 and 30 phr and more preferably between 10 and 25 phr. These thermoplastic polymers can in particular be poly(para-phenylene ether) polymers (denoted by the abbreviation "PPE"). These PPE thermoplastic polymers are well known to a person skilled in the art; they are resins, which are solids at ambient temperature (20° C.) and which are compatible with styrene polymers, which are used in particular to increase the Tg of TPE elastomers, the thermoplastic block of which is a styrene block (see, for example, "*Thermal, Mechanical and Morphological Analyses of Poly(2,6-dim-* ethyl-1,4-phenylene oxide)/Styrene-Butadiene-Styrene Blends", Tucker, Barlow and Paul, Macromolecules, 1988, 21, 1678-1685).

In addition to the carbon black described above, the composition can also comprise other fillers, whether reinforcing or nonreinforcing, such as reinforcing inorganic fillers (silica and/or alumina) or inert fillers (for example chalk).

2. Preparation

The TPE elastomers can be processed in the conventional way for TPEs, by extrusion or moulding, for example using a starting material available in the form of beads or granules.

The tread for the tyre according to the invention is prepared in the conventional way, for example by incorporation of the various components in a twin-screw extruder, so as to carry out the melting of the matrix and the incorporation of all the ingredients, followed by use of a die which makes it possible to produce the profiled element. The tread is subsequently patterned in the mould for curing the tyre.

If the elastomer block of the TPE is a saturated elastomer block, it may be necessary to include, in the tyre, an underlayer or adhesion layer under the patterned portion of the tread which will comprise a TPE having an unsaturated elastomer block in order to promote the adhesion between the said tread and the adjacent layer (for example the crown reinforcement or belt) within the finished tyre.

This tread can be conventionally fitted to a tyre, the said tyre comprising, in addition to the tread according to the invention, a crown, two side walls and two beads, a carcass reinforcement anchored to the two beads, and a crown reinforcement. Optionally and as indicated above, the tyre according to the invention can additionally comprise an underlayer or an adhesion layer between the patterned portion of the tread and the crown reinforcement.

EXAMPLES OF THE IMPLEMENTATION OF THE INVENTION

Tread compositions for a tyre according to the invention were prepared as indicated above.

Tyres according to the invention were subsequently prepared according to the usual methods, with the conventional constituents known to a person skilled in the art: a crown, two sidewalls and two beads, a carcass reinforcement anchored to the two beads, a crown reinforcement and a tread, the tread being that described for the requirements of the present invention.

The properties of the tyres according to the invention can be evaluated by tests carried out on tyres or from tests on tread composition samples as indicated below.

Grip Tests: Braking on Wet Ground, with an ABS System

The tyres are fitted to a motor vehicle or car of Renault make and Mégane 1.6 RTE model, equipped with an ABS braking system, and the distance necessary to go from 80 km/h to 10 km/h is measured during sudden braking on ground covered with a thickness of 1 mm of water (bituminous concrete). A value lower than that of the control, arbitrarily set at 100, indicates an improved result, that is to say a shorter braking distance.

Tests of Measurement of Rolling Resistance

The rolling resistance of the tyres was measured on a rolling drum, according to the ISO 87-67 (1992) method. The results presented below are presented in base 100: an arbitrary value of 100 is given for the rolling resistance of the control, a result below 100 indicating a better rolling resistance performance and thus a decrease in the rolling resistance.

Tests of Measurement of Wear Resistance

The wear resistance of the tyres was measured by a "rolling on a circuit" trial. The circuit is travelled under conditions which make it possible to wear the tyres in a manner reproducible between the control and the solution tested: the vehicles move in convoy, which guarantees that the tyres are subjected to the same conditions of speed, of accelerations, of temperature and of nature of the ground. The rolling circuit is travelled until a distance of greater than 1000 km is achieved.

The front offside tyre of the vehicle is considered. The control tyre and the solution tested are weighed before running and after more than 1000 km. The weight lost by the control sets a wear performance at 100%. A solution exhibiting a value of greater than 100 represents an improved result, that is to say a lower weight lost.

EXAMPLE

A tyre in accordance with the invention was prepared as indicated above and compared with a control tyre provided with a conventional "Green tyre" tread having a low rolling resistance and with a tyre similar to the tyre in accordance with the invention but not comprising a reinforcing filler. The compositions of these treads are presented in Table 1 below.

TABLE 1

| Composition | A-1 | A-2 | A-3 |
|---|---|---|---|
| SBR (1) | 40 | 0 | 0 |
| SBR (2) | 60 | 0 | 0 |
| TPE elastomer (3) | 0 | 100 | 100 |
| Filler (4) | 90 | 0 | 0 |
| Coupling agent (5) | 7.5 | 0 | 0 |
| Carbon black (6) | 4 | 0 | 60 |
| Liquid plasticizer 1 (7) | 20 | 0 | 0 |
| Liquid plasticizer 2 (8) | 0 | 20 | 20 |
| Resin (9) | 20 | 0 | 0 |
| Anti-ozone wax | 1.5 | 0 | 0 |
| Antioxidant (10) | 2 | 0 | 0 |
| DPG (11) | 1.5 | 0 | 0 |
| ZnO (12) | 2.75 | 0 | 0 |
| Stearic acid (13) | 2 | 0 | 0 |
| CBS (14) | 2.1 | 0 | 0 |
| Sulphur | 1.4 | 0 | 0 |

(1) SSBR solution (contents expressed as dry SBR: 41% of styrene, 24% of 1,2-polybutadiene units and 51% of trans-1,4-polybutadiene units (Tg = −25° C.);
(2) SSBR solution (contents expressed as dry SBR: 29% of styrene, 5% of 1,2-polybutadiene units and 80% of trans-1,4-polybutadiene units (Tg = −56° C.);
(3) SIS thermoplastic elastomer, Hybrar 5125 from Kuraray;
(4) Silica (Zeosil 1165MP from Rhodia);
(5) Coupling agent, TESTP (Si69 from Degussa);
(6) Carbon black N234;
(7) TDAE oil, Vivatec 500 from Hansen & Rosenthal;
(8) Paraffinic oil, Extensoil 51 24T from Repsol or Tudalen 1968 from Klaus Dahleke;
(9) C$_5$/C$_9$ resin, CrayValley Wingtack from STS;
(10) N-(1,3-Dimethylbutyl)-N-phenyl-para-phenylenediamine (Santoflex 6-PPD from Flexsys);
(11) DPG = diphenylguanidine (Perkacit DPG from Flexsys);
(12) Zinc oxide (industrial grade, Umicore);
(13) Stearin (Pristerene from Uniqema);
(14) N-Cyclohexyl-2-benzothiazolesulphenamide (Santocure CBS from Flexsys).

The great saving in means, related to the use of TPE elastomers in the composition of the tread, may be noted in these compositions.

The performance of the invention was subsequently evaluated on a tyre (205/55 R16). To this end, a tyre B3 provided with a tread having the composition A3 in accordance with the invention was compared with a control B2 provided with a tread having the composition A2, itself compared with a tyre B1 provided with a tread having the composition A1. These tyres were evaluated in a test of grip under braking conditions, in a rolling resistance test and in a wear resistance test. The results are presented in Tables 2 and 3.

TABLE 2

| Tyre | B-1 | B-2 |
|---|---|---|
| Formulation of the tread | A-1 | A-2 |
| Braking distance (base 100) | 100 | 83 |
| Rolling resistance (base 100) | 100 | 97 |

TABLE 3

| Tyre | B-2 | B-3 |
|---|---|---|
| Formulation of the tread | A-2 | A-3 |
| Braking distance (base 100) | 100 | 110 |
| Rolling resistance (base 100) | 100 | 135 |
| Wear resistance (base 100) | 100 | 1750 |

The results presented in Tables 2 and 3 demonstrate that the tread with the composition A3 according to the invention makes possible a very great improvement in the wear resistance while retaining acceptable properties of wet grip and rolling resistance. Furthermore, it is highly surprising, in the light of the state of the art, that the TPE elastomer, a reinforcing filler and an optional plasticizer are sufficient, by themselves alone, in the composition for the tread to be usable in a tyre, the performance of which is furthermore improved.

The invention claimed is:

1. A tire comprising:
a tread,
a crown with a crown reinforcement,
two sidewalls,
two beads, and
a carcass reinforcement anchored to the two beads and extending from one sidewall to the other,
wherein the tread comprises at least one thermoplastic elastomer and carbon black at a content by volume within a range extending from 5% to 30%,
wherein the thermoplastic elastomer is a block copolymer comprising at least one elastomer block and at least one thermoplastic block, and
wherein the total content of thermoplastic elastomer is within a range varying from 65 to 100 phr.

2. The tire according to claim 1, wherein the number-average molecular weight of the thermoplastic elastomer is between 30,000 and 500,000 g/mol.

3. The tire according to claim 1, wherein the at least one elastomer block is chosen from elastomers having a glass transition temperature of less than 25° C.

4. The tire according to claim 1, wherein the at least one elastomer block is selected from the group consisting of ethylene elastomers, diene elastomers, and mixtures thereof.

5. The tire according to claim 4, wherein the at least one elastomer block is chosen from ethylene elastomers.

6. The tire according to claim 4, wherein the at least one elastomer block is chosen from diene elastomers.

7. The tire according to claim 6, wherein the at least one elastomer block is selected from diene elastomers resulting from isoprene, butadiene or a mixture thereof.

8. The tire according to claim 1, wherein the at least one thermoplastic block is chosen from polymers having a glass transition temperature of greater than 80° C.

9. The tire according to claim 1, wherein the at least one thermoplastic block is a semicrystalline thermoplastic block and is chosen from polymers having a melting point of greater than 80° C.

10. The tire according to claim 1, wherein the at least one thermoplastic block is selected from the group consisting of polyolefins, polyurethanes, polyamides, polyesters, polyacetals, polyethers, polyphenylene sulphides, polyfluorinated compounds, polystyrenes, polycarbonates, polysulphones, polymethyl methacrylate, polyetherimide, thermoplastic copolymers, and mixtures thereof.

11. The tire according to claim 1, wherein the at least one thermoplastic block is chosen from polystyrenes.

12. The tire according to claim 1, wherein the at least one thermoplastic elastomer is selected from the group consisting of styrene/butadiene thermoplastic elastomers, styrene/isoprene thermoplastic elastomers, styrene/butadiene/isoprene thermoplastic elastomers, styrene/butadiene/styrene thermoplastic elastomers, styrene/isoprene/styrene thermoplastic elastomers, styrene/butadiene/isoprene/styrene thermoplastic elastomers and mixtures thereof.

13. The tire according to claim 1, wherein the at least one thermoplastic elastomer is the only elastomer present in the tread.

14. The tire according to claim 1, wherein the tread further comprises at least one one non-thermoplastic elastomer at a total content of at most 35 phr.

15. The tire according to claim 1, wherein the carbon black is present at a content within a range extending from 7% to 30%.

16. The tire according to claim 15, wherein the carbon black is present at a content within a range extending from 10% to 25%.

17. The tire according to claim 1, wherein the carbon black is chosen from carbon blacks with a BET specific surface of greater than 80 m²/g.

18. The tire according to claim 17, wherein the carbon black is chosen from carbon backs with a BET specific surface of greater than 90 m²/g.

19. The tire according to claim 18, wherein the carbon black is a carbon black with a BET specific surface of greater than 120 m²/g.

20. The tire according to claim 1, wherein the tread further comprises a plasticizer.

21. The tire according to claim 20, wherein the plasticizer is present at a content of between 5 and 85 phr.

22. The tire according to claim 20, wherein the plasticizer is a plasticizing resin, a plasticizing oil, or a combination of a plasticizing resin and a plasticizing oil.

23. The tire according to claim 22, wherein the plasticizing oil is a paraffinic oil.

24. The tire according to claim 20, wherein the plasticizer is present at a content within a range extending from 10 to 60 phr.

* * * * *